US007014440B2

(12) United States Patent
Okumura et al.

(10) Patent No.: US 7,014,440 B2
(45) Date of Patent: Mar. 21, 2006

(54) METHOD OF MANUFACTURING RARE EARTH MAGNET AND POWDER COMPACTING APPARATUS

(75) Inventors: Shuhei Okumura, Mishima-gun (JP); Akira Nakamura, Ibaraki (JP)

(73) Assignee: Neomax Co., Ltd., Osaka (JP)

( * ) Notice: Subject to any disclaimer, the term of this patent is extended or adjusted under 35 U.S.C. 154(b) by 99 days.

(21) Appl. No.: 10/459,425

(22) Filed: Jun. 12, 2003

(65) Prior Publication Data

US 2003/0209842 A1 Nov. 13, 2003

Related U.S. Application Data

(62) Division of application No. 09/891,497, filed on Jun. 27, 2001, now Pat. No. 6,602,352.

(30) Foreign Application Priority Data

Jun. 29, 2000 (JP) ............................ 2000/195757
Dec. 15, 2000 (JP) ............................ 2000-381282

(51) Int. Cl.
*B29C 43/02* (2006.01)

(52) U.S. Cl. ............................ 425/3; 425/78; 425/215; 425/364 R; 425/415

(58) Field of Classification Search .................... 425/3, 425/DIG. 33, 78, 364 R, 413–416, 68, 85, 425/215, 445
See application file for complete search history.

(56) References Cited

U.S. PATENT DOCUMENTS 4,075,042 A 2/1978 Das
5,383,978 A 1/1995 Yamamoto et al.
5,662,943 A * 9/1997 Yamashita et al. ............. 425/3
5,672,363 A * 9/1997 Sagawa et al. ................ 425/3
6,352,598 B1 3/2002 Hisamura et al.
6,432,158 B1 8/2002 Harada et al.
6,491,765 B1 12/2002 Okayama et al.

FOREIGN PATENT DOCUMENTS

JP 61-005969 2/1986
JP 61-121406 6/1986
JP 63-033505 2/1988
JP 03-234603 10/1991
JP 06-108111 A * 4/1994
JP 07-132399 A * 5/1995
JP 08-316074 11/1996
JP 08-330135 12/1996
JP 11-273978 10/1999

OTHER PUBLICATIONS

Machine Translation of Japanese Patent No. 08-330135. Dec. 13, 1996.

* cited by examiner

*Primary Examiner*—Robert Davis
*Assistant Examiner*—Thu Khanh T. Nguyen
(74) *Attorney, Agent, or Firm*—Nixon Peabody LLP; Jeffrey L. Costellia

(57) ABSTRACT

A method and apparatus for manufacturing a rare earth magnet is disclosed. In a first step, a compact is produced by compacting rare earth alloy powder in a predetermined space in an orienting magnetic field. Next, a demagnetizing process is performed for the compact, and the compact is ejected from the predetermined space. Then, a additional demagnetizing process is performed for magnetic powder adhering to a surface of the compact by applying an magnetic field to the compact after the compact is ejected.

9 Claims, 8 Drawing Sheets

METHOD OF MANUFACTURING RARE EARTH MAGNET AND POWDER COMPACTING APPARATUS

This application is a divisional application from a prior application Ser. No. 09/891,497 filed Jun. 27, 2001 now U.S. Pat. No. 6,602,352.

BACKGROUND OF THE INVENTION

1. Field of the Invention

The present invention relates to a method for manufacturing a rare earth magnet and a powder compacting apparatus used in the manufacturing method.

2. Discussion of the Related Art

A rare earth sintered magnet is produced by pulverizing an alloy for a rare earth magnet to form alloy powder, compacting the alloy powder, and subjecting the alloy powder to a sintering process and an aging process. Currently, there are two kinds of magnets known as the rare earth sintered magnets, i.e., a samarium-cobalt magnet and a neo-dymium-iron-boron magnet each of which are widely used in various fields. Hereinafter, the magnet of neodymium, iron, and boron system is referred to as an "R-T-(M)-B type magnet", where R represents a rare earth element or yttrium, T represents iron, or a transition metal in which cobalt or nickel is substituted for part of iron, M represents an additional element, and B represents boron or a compound of boron and carbon. Between the two kinds of magnets, the R-T-(M)-B type magnet exhibits the maximum magnetic energy product among various kinds of magnets, and the price thereof is relatively cheap. For these reasons, the R-T-(M)-B type magnet is used for various kinds of electronics appliances.

When an anisotropic rare earth sintered magnet is manufactured, an orienting magnetic field is applied to magnetic powder during press compaction. Thus, the produced compact is in a strongly magnetized condition. In order to remove the magnetization, a demagnetizing process is performed in a press, however, it is extremely difficult to attain the perfect demagnetization. Therefore, when the demagnetized compact is ejected from a die hole (a cavity) of a press, magnetic powder, which is dispersed around the die hole, is strongly attracted to the compact According to measurements, a magnetization of 0.002 to 0.006. T (tesla) remains in the compact after the demagnetizing process.

Since the demagnetizing process is performed for the compact while in the cavity, the intensity variation of the magnetic field formed for the demagnetization process is designed so as to have the most suitable profile for the demagnetization of the compact in the center portion of the cavity. As a result, magnetic powder adhering to magnetic material components of a magnetic field generating portions positioned over and under the cavity and magnetic powder adhering on the die of the press and the like are demagnetized only a little. According to measurements, a magnetization of about 0.005 to 0.010 T remains in the powder adhering to a pole piece (a magnetic portion of an upper punch) accompanied with the magnetic field generating coil.

The compact and powder, both of which are magnetized, mutually attract each other strongly. Accordingly, when the compact is ejected from the cavity of the press and placed onto a carrying device, the magnetic powder adhering to the upper punch of the pressing apparatus and the magnetic powder scattered on the die are attracted to the compact, and firmly adsorbed to the surface of the compact.

In order to remove the magnetic powder adhering to the surface of the compact from the surface of the compact, nitrogen gas ($N_2$ gas) was sprayed on the compact while the compact is being carried on a carrying belt and transported. However, it is impossible to entirely remove the magnetic powder adhering to a portion of the compact which little receives the $N_2$ gas. Therefore, the magnetic powder attracted to the surface of the compact by the strong magnetic force, results in the remaining magnetic powder being welded to the surface of a sintered compact body by sintering. This magnetic powder, welded by the sintering, increases the degree of unevenness in the surface of the sintered compact body. Thus, it is necessary to remove the welded portions by grinding to provide a smooth surface on the sintered body.

Conventionally, after the large block-like sintered, compact body was produced, the body was processed by cutting, so as to obtain a plurality of relatively small sintered bodies. In this instance, even if protrusions caused by the adhering powder existed on the surface of the sintered compact body, the protrusions in the surface of the respective sintered bodies cut out by the cutting process did not cause serious problems.

In order to improve the production yield of small magnets, however, a pressing process has been recently adopted in which the compact produced has the shape of the final product. In this instance, if the undesired magnetic powder adheres to the surface of the compact produced, the period of time to complete the grinding process after the sintering is increased, and the advantages of mass production are diminished.

Japanese Laid-Open Patent Publication No. 3-234603 discloses a powder removing device in which a ceramic powder compact situated in a cylindrical brush, and the powder adhering to the surface of the compact is blown off while the brush is rotating.

If these techniques are adapted to the production of a compact from rare earth magnetic powder, the following problems arise.

A compact of a rare earth alloy powder, in which the powder orientation in the magnetic field is significant, has a compact density that is suppressed to be as low as a density of 3.9 to 5.0 g/cm$^3$, which is soft. Further, in the case where the rare earth alloy powder is produced by a rapid cooling method, the particle size distribution curve of the powder is sharp. Thus, the strength of the rare earth compact is lowered when compared with the strength of a compact using powder produced by an ingot casting method. Additionally, if the surface of the compact is rubbed with a brush, the corners of the compact may be lost, or the compact may be broken.

It takes time and effort to insert the rare earth compact into a powder removing device and to take it out of the powder removing device, such that the overall production yield is reduced.

An additional disadvantage, is that the recovered powder reacts with oxygen in the air, so as to be rapidly oxidized. Thus, the possibility exists that a burning accident may occur in the powder removing device which is a dangerous situation.

For the reasons described above, an optimum powder removing device is required in a method for manufacturing a rare earth sintered magnet.

SUMMARY OF THE INVENTION

A primary object of the present invention is to provide a method for manufacturing a rare earth magnet with increased quantity production characteristics in which method the undesired magnetic powder adsorbed on the surface of a compact is appropriately removed without breaking the compact, thereby reducing the period of time required for grinding a magnet after sintering.

Another object of the present invention is to provide a powder compacting apparatus suitably used in the above-mentioned manufacturing method.

The present invention relates to a method for manufacturing a rare earth magnet including:

a first step of producing a compact by compacting rare earth alloy powder in a predetermined space in an orienting magnetic field;

a second step of performing a demagnetizing process for the compact;

a third step of ejecting the compact from the predetermined space; and a fourth step of performing a demagnetizing process for magnetic powder adhering to a surface of the compact by applying an additional magnetic field to the compact after the third step.

In a preferred embodiment, in the first step, the rare earth alloy powder is carried on a member disposed around the predetermined space in a condition where the alloy powder is in contact with the member which is fed into the predetermined space. In another preferred embodiment, the first step includes a step of compressing the rare earth alloy powder in a direction substantially identical to a direction in which the orienting magnetic field is applied to the rare earth alloy powder. In still another preferred embodiment, the magnetic powder adhering to the surface of the compact is magnetized by the orienting magnetic field in the first step. While in still another preferred embodiment, the magnetic powder is magnetized in a condition where the magnetic powder adheres to a magnetic portion included in means for applying the orienting magnetic field to the rare earth alloy powder. In another embodiment, after the third step, the magnetization of the compact. In another embodiment, the fourth step includes a step of applying an alternative magnetic field to the compact.

Preferably, the fourth step includes a step of applying a decremental alternating magnetic field to the compact while the compact is moving.

Preferably, the step of applying the decremental alternating magnetic field is performed by using a plurality of coils.

Preferably, the alternating magnetic field is configured by two or more pulse magnetic fields of different directions. In another preferred embodiment, the fourth step is performed by a plurality of coils, and magnetic fields respectively formed by the plurality of coils are reapplied to the compact while the compact is moving. In still another preferred embodiment, the maximum value of the additional magnetic filed in the vicinity of the surface of the compact is in the range of not less than 0.02 tesla nor greater than 0.5 tesla. Further, in a preferred embodiment, the fourth step includes a step of spraying a gas to the surface of the compact, which is preferably an inert gas.

The method may further include a step of placing the compact on a sintering base plate, wherein the demagnetizing process in the fourth step is performed enroute while moving the compact onto the sintering base plate from a position in which the compacting is performed.

The method may further include a step of recognizing a shape of the compact before the step of placing the compact on the sintering base plate, wherein the demagnetizing process of the fourth step is performed before the step of recognizing the shape of the compact.

The method may further include:

a step of placing the compact on a nonmagnetic mesh member for moving the compact from a first position to a second position;

a step of moving the compact on the nonmagnetic mesh member onto a sintering base plate in the second position; and a step of sintering the compact, wherein the fourth step is performed between the first position and the second position.

In this embodiment, an additional magnetic field is formed by using an electromagnet disposed under the nonmagnetic mesh member. In a preferred embodiment, a suction port of a gas suction device is disposed under the mesh member, and magnetic powder removed from the surface of the compact is accommodated in the suction device. Preferably, the suctioned magnetic powder is isolated from the air.

Preferably, the fourth step is performed while the compact is moving on the nonmagnetic mesh member.

The method may further include a step of performing image processing by imaging the compact in the second position with an imaging device disposed on one side of the nonmagnetic mesh member and a light source disposed on the other side of the nonmagnetic mesh member.

In a preferred embodiment, the third step includes a step of ejecting the compact from the predetermined space by adsorbing the compact due to a magnetic force.

In a preferred embodiment, the rare earth alloy powder is powder of R-T-(M)-B type rare earth magnet alloy.

In a preferred embodiment, a lubricant is added to the rare earth alloy powder.

In a preferred embodiment, a density of the compact is in the range of 3.9 $g/cm^3$ to 5.0 $g/cm^3$.

In a preferred embodiment, the rare earth alloy powder is produced by a rapid cooling method.

In a preferred embodiment, the number of particles, having a particle diameter of 1.0 $\mu$m or less, in the rare earth alloy powder is adjusted to be 10% or less of the entire number of particles in the rare earth alloy powder.

Alternatively, the powder compacting apparatus of the present invention includes:

a device for producing a compact by compacting rare earth alloy powder in an orienting magnetic field;

a device for performing a demagnetizing process for the compact; and a device for performing a demagnetizing process for magnetic powder adhering to a surface of the compact by applying an additional magnetic field to the compact along the route for moving the compact from a position in which the compaction of the rare earth alloy powder is performed.

In a preferred embodiment, the device for producing the compact includes a magnetic field generator for generating the orienting magnetic field in a first direction, and a compacting device for compressing the rare earth alloy powder in the first direction.

In a preferred embodiment, the device for performing the demagnetizing process for the magnetic powder can apply an alternating magnetic field to the compact.

The powder compacting apparatus may further include a device for moving the compact, wherein the device for performing the demagnetizing process applies a decremental alternating magnetic field to the compact while the compact is moving.

Preferably, the device for performing the demagnetizing process for the magnetic powder includes a plurality of coils disposed along a route for moving the compact.

The powder compacting apparatus may further include a device for moving the compact, wherein the device for performing the demagnetizing process for the magnetic powder includes a plurality of coils disposed along a route for moving the compact, and while the compact is moving, the means for performing the demagnetizing process for the magnetic powder applies magnetic to the compact.

The powder compacting apparatus may further include a device for spraying a gas on the surface of the compact along the route for moving the compact from a position in which the compaction of the rare earth alloy powder is performed.

The powder compacting apparatus may further include a gas suction device having a suction port, wherein magnetic powder removed from the surface of the compact is drawn into the suction device.

The powder compacting apparatus may further include:

a nonmagnetic mesh member for moving the compact from a first position to a second position;

a device for placing the compact onto the nonmagnetic mesh member;

a device for driving the nonmagnetic mesh member; and a device for moving the compact on the nonmagnetic mesh member onto a sintering base plate in the second position.

In a preferred embodiment, at least part of the device for performing the demagnetizing process for the magnetic powder is configured by an electromagnet disposed under the nonmagnetic mesh member.

BRIEF DESCRIPTION OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

FIGS. 3A and 3B are enlarged cross-sectional views of the press shown in FIG. 2, in which FIG. 3A shows a powder compressed state, and FIG. 3B shows a compact exposed state.

FIGS. 4A and 4B are cross-sectional views of a powder removing device provided in the powder pressing apparatus shown in FIG. 1, in which FIG. 4A shows a state where a magnetic field is applied, and FIG. 4B shows a state where magnetic powder is recovered;

DETAILED DESCRIPTION OF THE INVENTION

Figure 1:
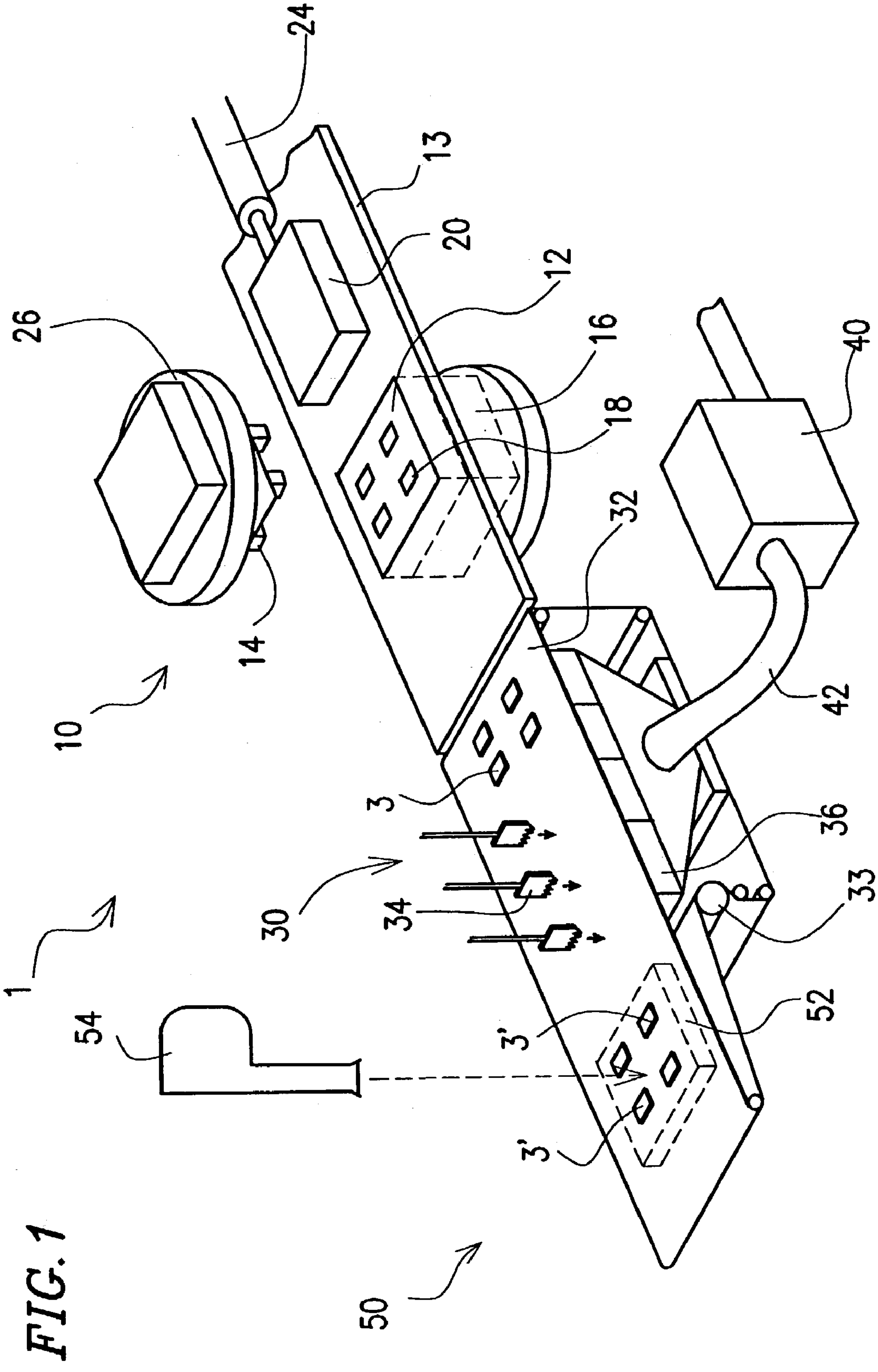
FIG. 1 is a perspective view showing a configuration of a powder compacting apparatus according to the present invention.

As described above, it is effective for improving production efficiency that, when a rare earth magnet is to be manufactured, magnetic powder adhering on a surface of a compact is removed before a sintering process. However, a compact which is produced by applying an orienting magnetic field in a press has a residual magnetization of a certain magnitude after a demagnetizing process. Magnetic powder is strongly attracted to such a compact magnetically, so that it is difficult to remove the magnetic powder from the compact.

One of reasons making the removal of magnetic powder from the surface of the compact difficult is that the compact of rare earth magnet is soft. This is especially the case when a lubricant is added to the compact to prevent oxidation of powder and improve powder orientation. The resulting compact is weak and easily broken. If a strong force is applied to such a compact, cracking and chipping may occur. Accordingly, a method for removing magnetic powder by using a brush, in which high stress is applied to a compact for removing magnetic powder from a compact, cannot be adopted.

It has been noted that the magnetic powder attracted to a compact is magnetic powder scattered around a compacting area of the press where the orienting magnetic field is applied, and the magnitude of magnetization of the magnetic powder has been measured. As a result, it was found that the magnetic powder had relatively large magnetization of about 0.005 to 0.010 T. This is because the orienting magnetic field applied to the magnetic powder is considerably large, i.e., about 1.0 to 1.5 T; while the demagnetizing process for the compact in the press is performed such that sufficient demagnetization is not achieved for powder around the compacting area. The magnetization of the magnetic powder is larger as compared with the magnetization of compacts after the demagnetizing process (0.002 to 0.006 T according to experiments). The measurement of the magnetization of the compact and the magnetic powder was performed by using a gauss meter having a measuring probe. In the measurement of the magnetization of the compact, probe was placed in contact with the surface of the compact. In the measurement of the magnetization of the magnetic powder, a part of the magnetic powder around the compacting area of the press is collected and the probe is placed in contact with the collected magnetic powder such that the measurement is not influenced by magnetized portion of the press. This is especially the case when a compact is produced where a pressing direction is substantially parallel to a direction in which an orienting magnetic field is generated. Magnetic powder having a large magnetization adheres to the compact. This is due to the large amount of magnetic powder that is strongly magnetized by an orienting magnetic field adhering to a magnetic portion of a press (for example, a pole piece disposed in an upper portion of an upper punch), and magnetic powder having such large magnetization drops due to vibration or the like and adheres to the compact.

From the above description, it is considered that a principle reason making the removal of magnetic powder from a compact difficult is the fact that the magnetic powder has relatively large magnetization. Accordingly, if the demagnetization is performed by applying an appropriate magnetic field for magnetic powder adsorbed by the compact, so as to reduce the magnetization of the magnetic powder, it is possible to greatly reduce the magnetically attracting force between the compact and the magnetic powder. As a result, the magnetic powder can be easily separated from the compact. Thus, it is possible to remove the magnetic powder from the compact without applying any strong force to the compact.

In addition, by reducing the attracting force (a magnetic force) which is received by the magnetic powder, a relatively small force is sufficient for separating the magnetic powder from the compact. As a result, it is unnecessary to remove the magnetic powder from the compact by means of a strong force such as by using a brush or the like, so that it is possible to collect the magnetic powder without scattering. Accordingly, the magnetic powder of rare earth alloy which may react with oxygen in the air and easily cause burning can be surely and easily recovered. Thus, the safety can be enhanced.

Hereinafter, preferred embodiments of the invention will be described with reference to the accompanying drawings.

FIG. 1 shows a configuration of a powder compacting apparatus 1 of the invention. The powder compacting apparatus 1 includes a press 10 for producing a compact by compacting rare earth alloy powder, a powder removing device 30 for demagnetizing magnetic powder adhering to the compact, and an imaging section 50 for imaging the compact.

The press 10 will be described with reference to FIGS. 1 to 3A and 3B.

The press 10 includes a die 12 having through holes (die holes) for forming cavities, a base plate 13 in which the die 12 is embedded, and an upper punch 14 and a lower punch 16 for compressing powder in the through holes of the die 12. In a condition where an upper portion of the lower punch 16 is partially inserted in the through holes of the die 12, cavities 18 are formed in an upper portion of the lower punch 16. Powder feeding into a cavity 18 is performed in the following manner. A feeder box (or a shoebox) 20 which is filled with powder is moved to the above of the cavity 18, and the powder is caused to drop in the cavity from a bottom (an opening portion) of the feeder box 20. Because uniform filling of powder cannot be attained only by the gravity drop, it is preferred that a shaker or an agitator (not shown) disposed in the feeder box 20 be driven in a horizontal direction, so as to push the alloy powder into the cavity. When the feeder box 20 is withdrawn from the above of the cavity, an upper portion of the filling powder is leveled or wiped off by an edge of a bottom portion of the feeder box 20. Thus, the cavity can be filled with the powder of a predetermined amount to be compacted with good precision.

Figure 2:
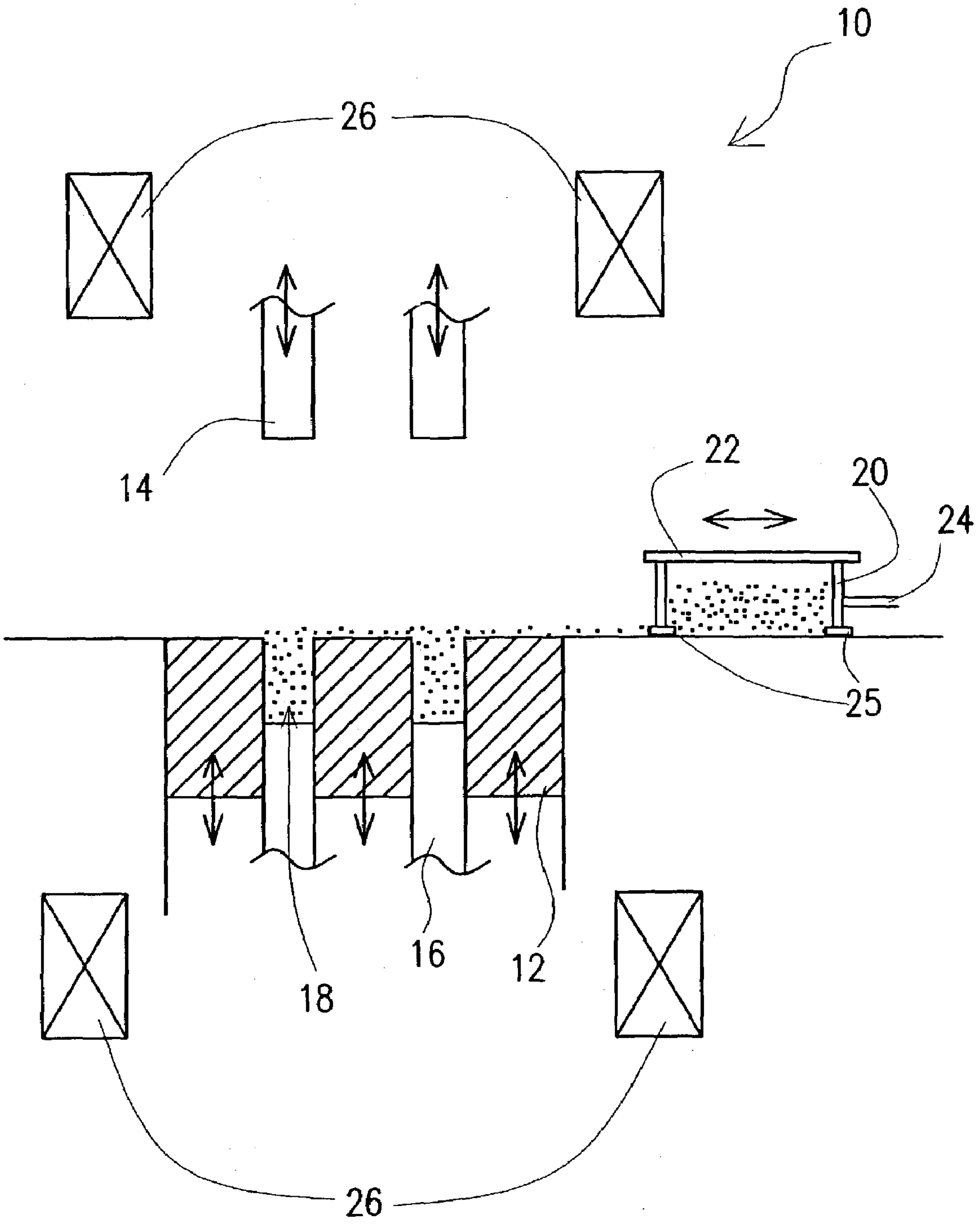
FIG. 2 is a cross-sectional view of a press provided in the powder compacting apparatus shown in FIG. 1.

The feeder box 20 is driven by an air cylinder 24, a linear motor, or the like. The feeder box 20 horizontally moves between a position in which powder is supplied to the feeder box 20 and a position of the above of the cavity 18. As shown in FIG. 2, a lid 22 is disposed over the feeder box 20. The lid 22 can hermetically seal the feeder box 20. A fluorocarbon resin thin plate 25, about 5 mm in thickness for example, is disposed in a bottom portion of the feeder box 20. Due to the fluorocarbon resin thin plate 25, the presence of alloy powder between the feeder box 20 and the base plate 13 or the die 12 does not occur, and, it is possible for the feeder box 20 to slide on a base plate 13 or the die 12 of the press 10. Since the fluorocarbon resin thin plate 25 is in close contact with the base plate 13 and the die 12, an amount of alloy powder of the feeder box escaping to the exterior can be reduced.

As described above, the opening portion is formed in a lower face of the feeder box 20. When the feeder box 20 covers the cavity 18, the alloy powder in the feeder box 20 is supplied to the interior of the cavity 18 via the opening portion. After the powder is supplied into the interior of the cavity 18, the feeder box 20 is withdrawn from the above of the cavity 18, and the rare earth alloy powder is leveled by the lower face thereof. At this time, since the rare earth alloy powder is very fine (e.g., 2–6 $\mu$m (Mass Median Diameter)), a small amount of alloy powder sometimes leaks from the bottom portion of the feeder box 20. Part of the alloy powder leaking from the feeder box 20 is scattered on the surface of the die 12 or on the base plate 13 around the cavity 18.

Figure 3A:
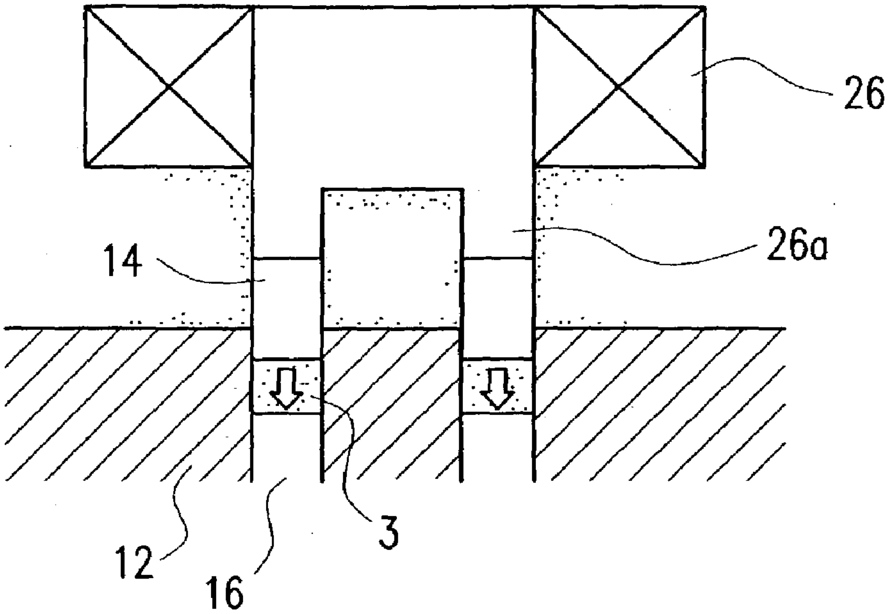

After the cavity 18 is filled with the powder, the upper punch 14 starts to move downwardly toward the cavity 18. As shown in FIG. 3A, the upper punch 14 and the lower punch 16 compresses and compacts the alloy powder in the cavity 18, so as to produce the powder compact 3. The density of the compact 3 is relatively low, i.e., 3.9 g/cm$^3$ to 5.0 g/cm$^3$. In compressing, an orienting magnetic field (a static magnetic field) formed by magnetic field generating coils 26 is applied to the powder within the cavity 18. The magnitude of the orienting magnetic field is set to be about 1.0 to 1.5 T. In this embodiment, the orienting magnetic field is applied in a direction parallel to a compressing direction of the powder. The direction of the orienting magnetic field is represented by white arrows in FIG. 3A. The thus formed powder compact 3 is set in a strongly magnetized condition.

At this time, due to the orienting magnetic field formed by the magnetic field generating coils 26 shown in FIGS. 1 and 2, the alloy powder scattered around the cavity 18 is also magnetized. A magnetic portion 26*a* as a pole piece is disposed between the coil 26 and the upper punch 14 so that the magnetic field formed by the magnetic field generating coil 26 is appropriately applied to the rare earth alloy powder in the cavity. The upper punch 14 is formed of a nonmagnetic material (or a feeble magnetic material) with saturation magnetization of 0.6 T or less. The magnetic portion 26*a* is formed of a material with saturation magnetization of 1.2 T or more such as carbon steel, Permendur, or the like. In this embodiment, when the orienting magnetic field is generated by the magnetic field generating coils 26, the magnetic portion 26*a* functioning as a pole piece is strongly magnetized. Thus, the scattered alloy powder is attracted to the magnetic portion 26*a* (see FIG. 3A) and is more strongly magnetized when this orienting magnetic field is applied.

Thereafter, a magnetic field in a direction opposite to the orienting magnetic field is applied in the cavity 18 by using the magnetic field generating coils 26, so as to perform demagnetization of the compact 3. A static magnetic field is employed for the demagnetization of the compact 3. The magnitude of the static magnetic field is set to be about 0.05 to 0.3 T, for example.

As described above, the magnetic field generating coils 26 are configured so as to generate a very large magnetic field for the purpose of alignment of the alloy powder during compression. The coils 26 are designed so as to generate a static magnetic field. In the case, such coils 26 are used to generate a strong magnetic field for the demagnetization in the press 10. Alternatively, the coils 26 may generate a pulse magnetic field as the orienting magnetic field.

As the result of the demagnetizing process, the magnetization of the compact 3 is reduced, but the demagnetization cannot be perfectly attained. A magnetization of about 0.002 to 0.006 T remains. The magnetic field for demagnetizing the compact is designed so as to have a profile most suitable for the demagnetization in the center portion of the cavity 18. As a result, magnetic powder adhering to the magnetic portions, such as pole pieces 26*a* accompanied with the magnetic field generating coils 26 positioned over and under the cavity 18, and magnetic powder adhering around the press 10 on the upper punch 14, the die 12, or the like, are only demagnetized to a small degree. The magnetic powder is only slightly demagnetized after being strongly magnetized by the application of the orienting magnetic field, such that the magnetic powder remaining has magnetization of about 0.005 to 0.010 T.

Figure 3B:
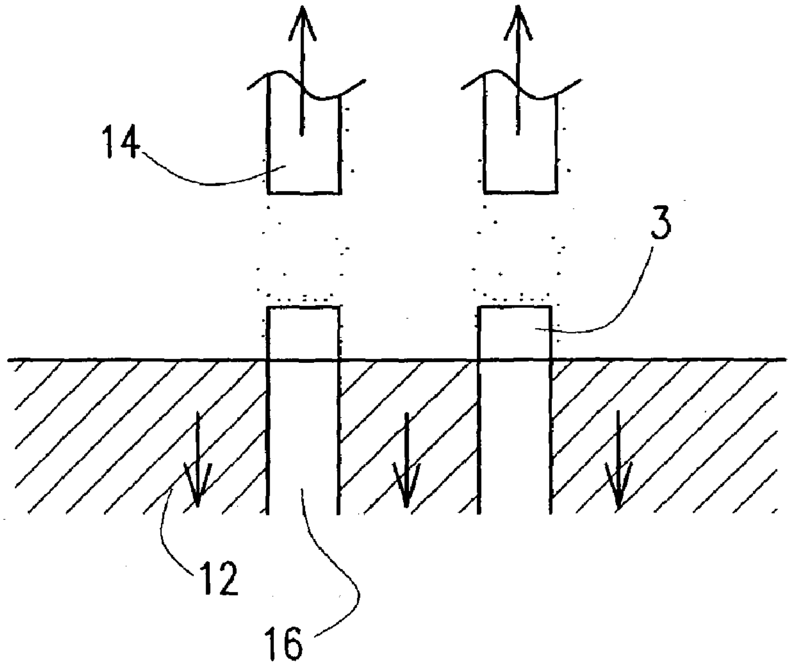

After the demagnetization, as shown in FIG. 3B, the upper punch 14 is elevated, and the die 12 is lowered, so that the compact 3 is exposed in the surface of the die 12. At this time, the magnetic powder adhering to the upper punch 14, the magnetic portion 26*a*, and the like sometimes drops due to the vibration of the press 10. The magnetic powder dropped on the compact 3 is magnetically attracted by the compact 3. In some cases, the magnetic powder scattered in the vicinity of the cavity 18 on the die 12 may be attracted by the compact 3 resulting in unwanted magnetic powder adhering to the surface of the compact 3.

In FIG. 1, the compact 3 exposed in the surface of the die is transported from the press 10 onto a carrying belt 32 by a transport device (not shown). The transport device is provided with a moving arm having an attracting portion at the end thereof to and from which the compact 3 can be attracted and detached. The attracting portion of the transport device can attract a compact by generating a magnetic force such as by using an electromagnet (or a permanent magnet), or a vacuum device can be used. Preferably, a plurality of compacts can be attracted at one time. When a compact is attracted by a magnetic force, the magnetization of the compact may increase.

The compact 3 is located in a first position (the most upstream position) on the carrying belt 32. The first position is, for example, a position in which the compact 3 is located in FIG. 1. When the compact 3 is located on the belt 32, it is desired that the belt 32 be stopped. If the compact 3 is located in a position where the belt 32 is stopped, the friction between the compact 3 and the belt 32 can be minimized, so that it is possible to prevent a lower face of the compact 3 to be shaved or chipped.

The belt 32 is driven by a carrying roller 33 coupled to a driving device such as a motor, so as to carry the compact 3 to a second position (the most downstream position) in which the imaging section 50 is disposed. The second position is, for example, a position in which a compact 3' is located in FIG. 1. A moving velocity of the belt 32 is set, for example, to be 0.05 to 0.8 m/min.

Between the first position and the second position on the belt 32, a powder removing device 30 for removing magnetic powder from the surface of the compact 3 is disposed. The powder removing device 30 will be described with reference to FIGS. 4A and 4B.

The powder removing device 30 is provided with an nitrogen ($N_2$) gas jet 34 positioned above the carrying belt 32. When it is sensed that the compact 3 reaches a position directly below the jet 34 by a sensor (not shown), an $N_2$ gas is jetted through the jet 34. When a sensor is properly disposed and functioning, the $N_2$ gas is intermittently jetted at a required time and the $N_2$ gas can be effectively utilized without any waste. It is desired that a buffer tank (not shown) be connected to the jet 34. In this configuration, it is possible to continuously and uniformly supply a gas of a predetermined amount to the compact 3. Preferably, the jet 34 is controlled so that a period of time for jetting a gas is constant.

Figure 5:
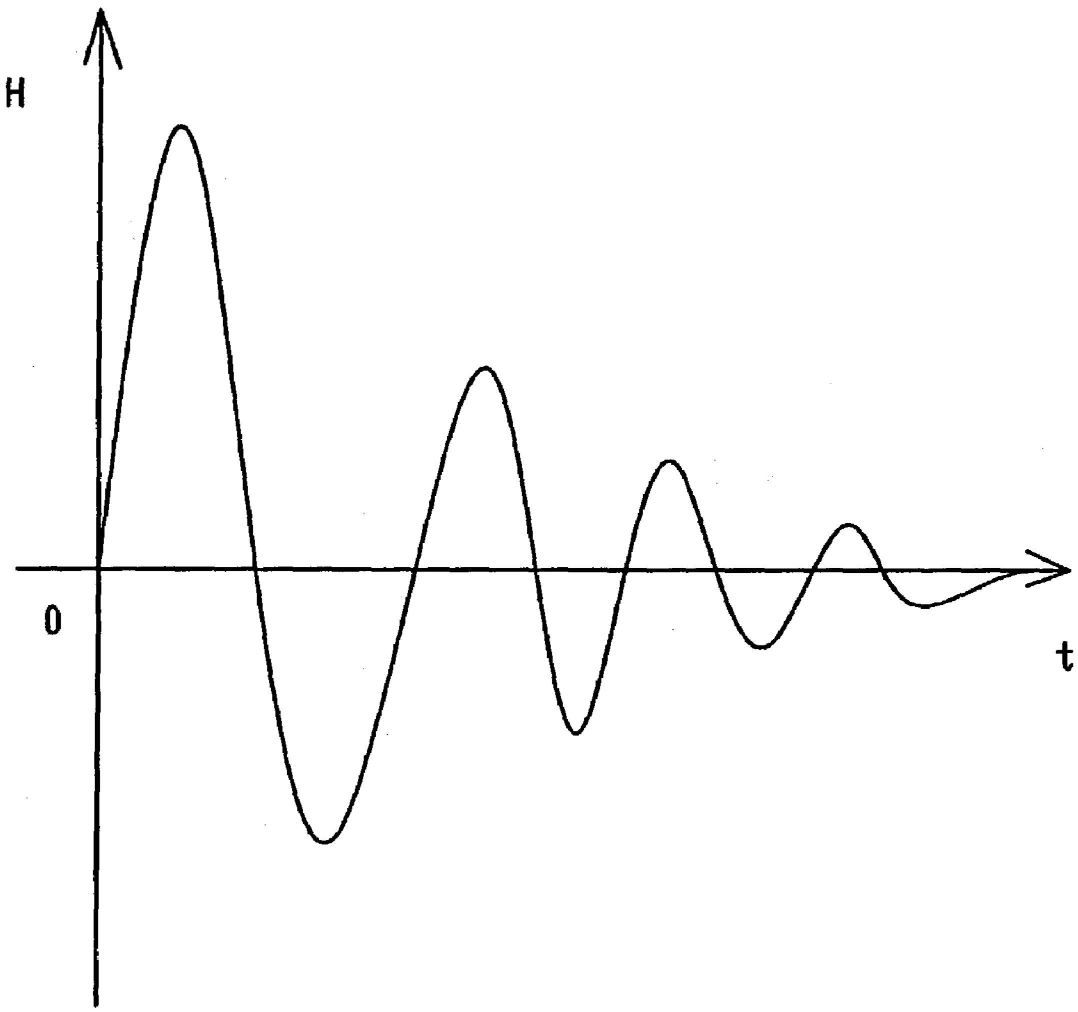
FIG. 5 is a graph illustrating a decremental alternating magnetic field used for demagnetization of magnetic powder.
Figure 6:
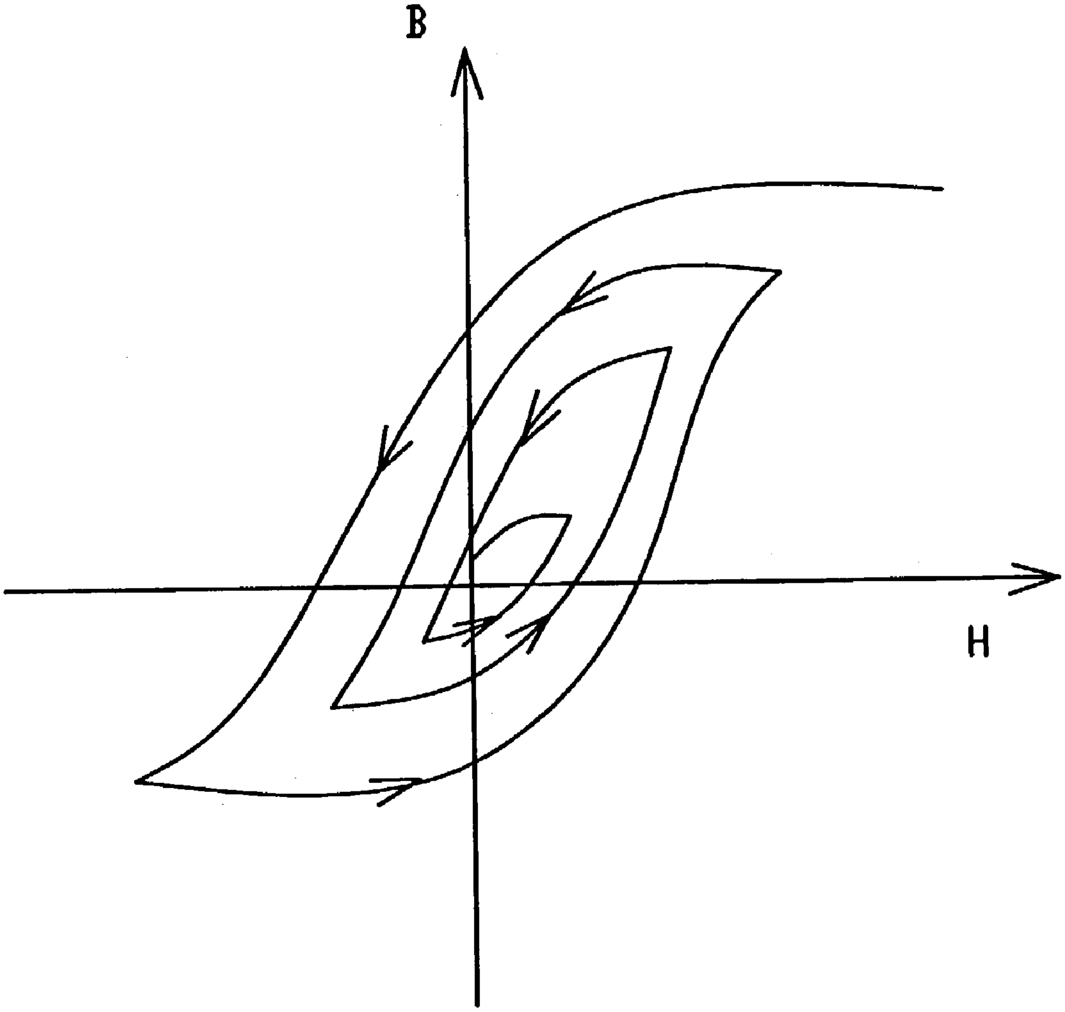
FIG. 6 is a graph illustrating a change in magnetization of magnetic powder with respect to a magnetic field applied to the magnetic powder.

The $N_2$ gas is jetted through the jet 34, and a magnetic field for performing demagnetization of magnetic powder adhered to the surface of the compact 3 is applied to the compact 3 by a demagnetizing coil (electromagnet) 36 positioned under the carrying belt 32. Preferably, the magnetic field for demagnetizing the magnetic powder has an amplitude that is gradually reduced while the inversion of pole is repeated with respect to the time (a decremental alternating magnetic field) as shown in FIG. 5. When the decremental alternating magnetic field is applied, the magnetization of the magnetic powder is lowered while exhibiting a hysteresis as shown in FIG. 6. In this process, the magnetic powder is subjected to a plurality of periods of a demagnetizing process while the magnitude of the magnetic field is being reduced, so that the demagnetization can be effectively performed. A circuit for applying a current for generating a decremental alternating magnetic field to the coil 36, is known. For example, a circuit disclosed in Japanese Laid-Open Patent Publication No. 61-121406 can be employed.

In this embodiment, the demagnetizing process of magnetic powder adhering to the compact 3 is performed by applying the above-mentioned decremental alternating magnetic field, while the compact 3 is being moved by driving the belt 32. In this way, the compacts 3 which are sequentially transported from the press 10 onto the belt 32 are continuously processed without stopping the movement of the compacts 3 for the purpose of the demagnetizing process. Accordingly, the production yield is improved.

Figure 4A:
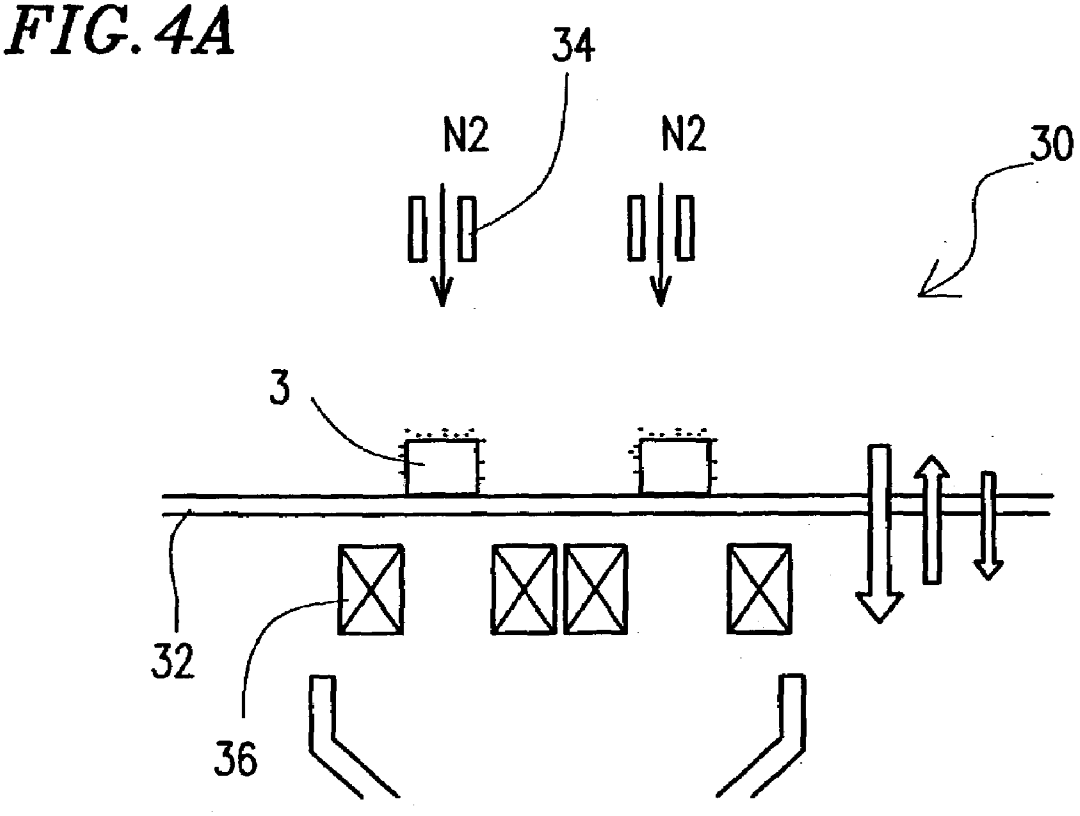
Figure 4B:
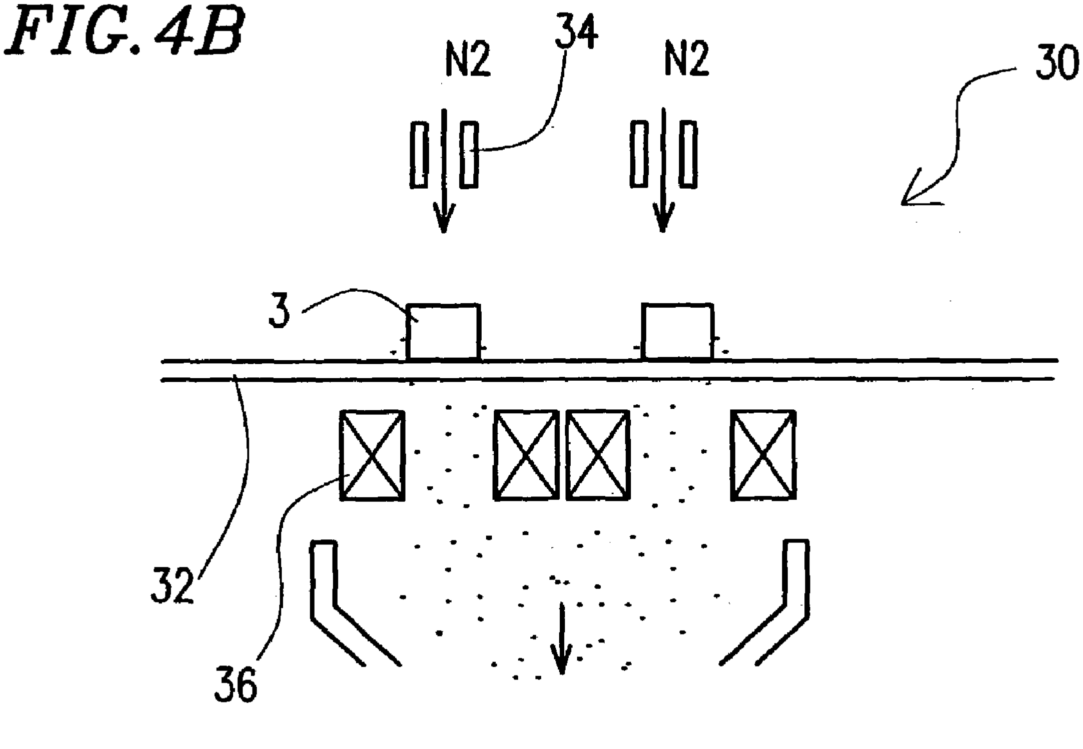

In order to perform the demagnetizing process while the compact is moving, it is preferred that a plurality of coils 36 (as shown in FIGS. 4A and 4B, two coils for example) are arranged along a carrying direction of the compact 3 be used. The coils are air-core coils having no core made of magnetic materials in a coil center portion. The intensity of the magnetic field formed by a coil 36 is varied depending on the compact 3 position over the coil. Therefore, when a magnetic field is applied to a compact 3 which is moving, a magnetic field of a desired intensity may not be applied to the compact 3 since it is not in an appropriate position (e.g., in a center portion of the coil). Accordingly, if one coil is used and a magnetic field is applied to a compact 3 while the compact 3 is moving, the magnetic powder cannot be sufficiently demagnetized in some cases. On the contrary, if a plurality of coils are used as described above, magnetic fields formed by respective coils are applied to the compact 3 which is moving. More preferably, each of the plurality of coils applies the demagnetizing magnetic field (e.g., decremental alternating magnetic field) to the moving compact plurality of times. Thus, the magnetic powder adhering to the compact 3 is subjected to the magnetizing process a plurality of times. In other words, the magnetic field of a desired intensity for demagnetization can be positively applied, so that the magnetic powder adhering to the compact 3 can be positively removed When a plurality of coils are used, the profile of a magnetic field formed by each coil and the timing for generating a magnetic field are set as required so that magnetic powder adhering to the compact 3 can be appropriately demagnetized. For example, a timing at which a compact reaches a position in the center portion of a coil, which is the closest to the press, is sensed by a sensor and serves as a reference, and therefore the timing at which each additional coil forms a decremental alternating magnetic field may be controlled. A timing for generating a magnetic field in each coil is set as required in view of a velocity of a compact.

In the case where the demagnetizing process is performed by a plurality of coils, the shape of an upper face of each coil (or a shape of an area in which a magnetic field is formed on a belt) can be of a rectangular shape that is short in a carrying direction of the compact and long in a direction perpendicular to the carrying direction. If a coil having such a shape is used, a magnetic field with a relatively high intensity and a reduced variation in intensity can be formed in the carrying direction of the compact. Accordingly, if such coils are arranged along the carrying direction of the compact, a desired magnetic field can be easily applied while the compact 3 is moving.

Alternatively, a plurality of coils may be controlled so that they generate similar decremental alternating magnetic fields at the same time, and one demagnetizing process may be performed in a period in which a compact 3 passes by the plurality of coils.

Alternatively, if an $N_2$ gas is sprayed to the compact 3 through the jet 34, and the above-mentioned alternating magnetic field is applied by the coil 36 while the magnetic powder is being moved, the magnetic powder can be easily removed from the compact 3. Accordingly, in this embodiment, even when more or less magnetization remains in a compact or magnetic powder, the magnetic powder can be removed from the compact.

The magnetic field for demagnetizing magnetic powder is preferably configured by the above-mentioned decremental alternating magnetic field, or an alternating magnetic field including two or more pulse magnetic fields in different directions. If sufficient demagnetizing effects can be attained, the magnetic field for demagnetizing magnetic powder may be configured by a single pulse magnetic field, or the like.

The maximum value of the intensity of the magnetic field for demagnetizing magnetic powder is desirably set to be 0.02 to 0.5 T. If the magnetic field to be applied is too weak however, the demagnetization of magnetic powder is not appropriately performed. If the magnetic field to be applied is too intense, the compact 3 with magnetization is attracted to the electromagnet 36, so that the compact 3 is moved largely in vertical direction on the carrying belt 32. As a result, the compact 3 may be broken or the corners thereof may be lost.

As described above, by applying a magnetic field to magnetic powder (including a lot of small blocks of powder) attracted to the surface of the compact 3 using the demagnetizing coils 36 having predetermined magnitude and direction, it is possible to perform the demagnetization of magnetic powder which has not been completely demagnetized by the press 10. Due to the demagnetization, the magnetically attracting force which is received by the magnetic powder from the compact 3 is lowered. The magnetization of the compact 3 itself can be demagnetized by the magnetic field generated by the coil 36. In this case, the attracting force between the compact 3 and the magnetic powder is further lowered.

The demagnetized magnetic powder is easily removed by a blow of gas sprayed to the compact 3 through the jet 34. If an inert gas such as $N_2$ gas is used, the possibility that the magnetic powder reacts with oxygen in the air is lowered, and the fear of burning can be avoided. As a result, the magnetic powder will not be attracted by the surface of the compact 3, and the magnetic powder cannot be fused to the surface of the compact in the sintering process, such that it is possible to shorten the time required for the grinding process of a sintered body.

As described above, a force in a vertical direction (the direction of magnetic field) acts on the compact 3 during the application of the magnetic field. In view of the force, preferably, a gap of about 5 to 20 mm is disposed between the demagnetizing coil 36 and the carrying belt 32 depending on the weight of the compact 3, and predetermined tension and deflection are applied to the carrying belt. In this case, even when the compact 3 is moved in the vertical direction, the movement can be easily absorbed by the carrying belt 32, that is the shock is absorbed, thereby suppressing the occurrence of chipping and crack of the compact 3.

In this embodiment, the belt 32 is configured as a mesh-like strip material. By using the mesh-like belt 32, the flow of the $N_2$ gas sprayed from the above is not blocked by the belt 32. Thus, the magnetic powder removed from the compact 3 can be sent to the underside of the belt 32 together with the $N_2$ gas.

The belt 32 is preferably made of a nonmagnetic metal material, such as SUS304 or the like. Since the belt 32 is formed of such a nonmagnetic material, the belt 32 itself will not be magnetized by the magnetic field generated by the demagnetizing coil 36. However, in the case where the belt 32 is formed of a magnetic material the belt 32 is magnetized such that the alternating magnetic field generated by the coil 36 is blocked by the belt 32. Further, even when the magnetic field is not perfectly blocked, the intensity of magnetic field in the vicinity of the compact 3 is lowered. Accordingly, the magnetic field generated by the coil 36 cannot be effectively utilized for the demagnetization of magnetic powder.

In addition, if the belt 32 is formed of a metal having a high melting point such as SUS304 or the like, the belt itself is not burned even when burning occurs by the oxidation of the magnetic powder. Thus, the safety is enhanced. There is a high probability that powder of rare earth alloy when exposed to air is oxidized so as to cause burning. For this reason, the protection of the surface of the coil 36 by a flame-resistant material is effective for reducing the breakage of coil.

Figure 7:
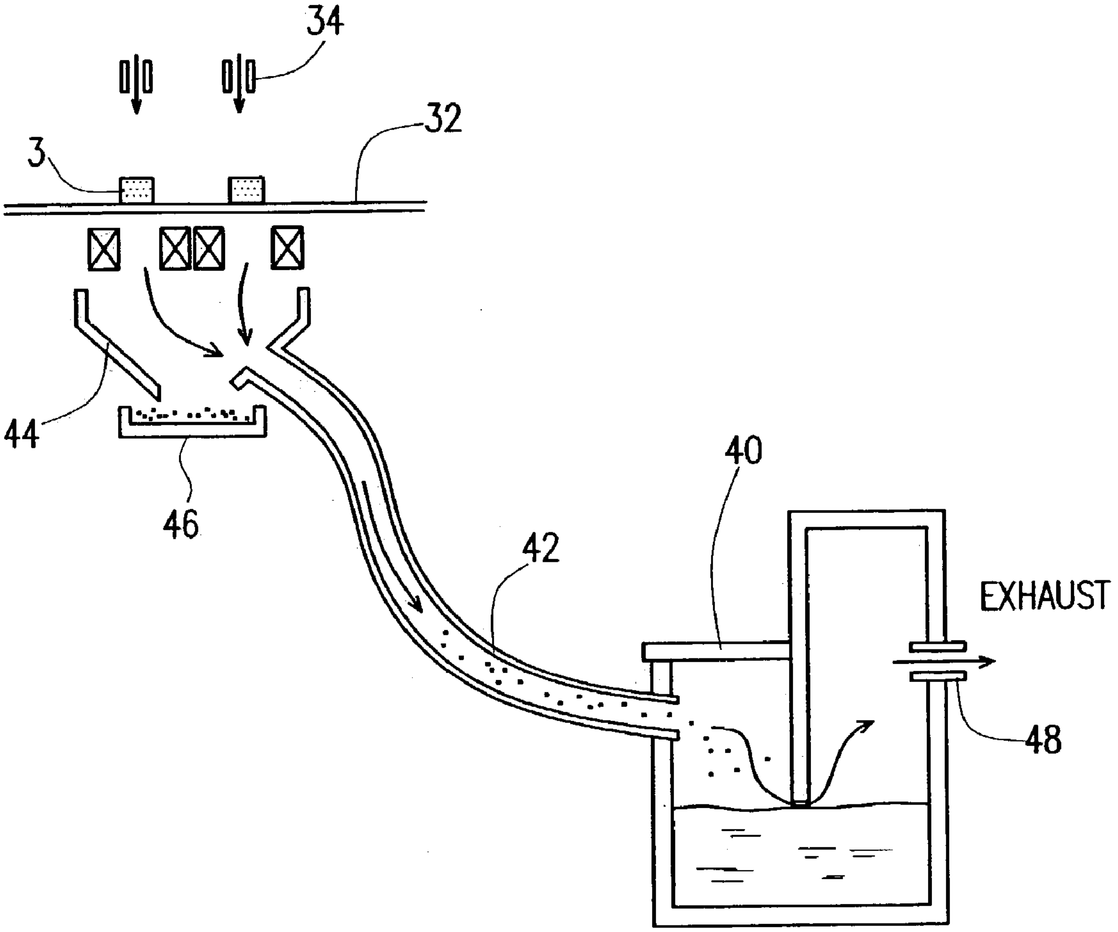
FIG. 7 is a cross-sectional view showing a mechanism for recovering the demagnetized magnetic powder.

Next, FIG. 7 is discussed. The magnetic powder blown of by the $N_2$ gas jetted from the jet 34 is sent to a dust collecting portion 44 disposed under the belt 32 together with the $N_2$ gas via an opening of the coil 36. The dust-collecting portion 44 has an enclosure for controlling the flow of $N_2$ gas, so as to prevent the gas including the magnetic powder from scattering into the surroundings.

To the dust-collecting portion 44, a recovering device 40 is coupled via a hose 42. The recovering device 40 draws the $N_2$ gas containing the demagnetized magnetic powder into the interior of the recovering device 40 through an opening which is coupled to the dust collecting portion 44. Preferably, the recovering device 40 generates a gas flow (a flow for the suction into the device 40) from the dust collecting portion 44 to the recovering device 40. Therefore, the recovering device 40 includes an exhausting port 48 coupled to an exhausting device (not shown), such as a blower or the like, so as to reduce a pressure in the inside of the recovering device 40. By the provision of the recovering device 40, an air flow of a high velocity is created from the above of the compact 3 placed on the belt 32 (the jet 34) to the underside thereof (the dust collecting portion 44). Thus, the demagnetized magnetic powder can be safely recovered without scattering the magnetic powder into surroundings.

The powder contained in the $N_2$ gas flowing into the recovering device 40 is separated by a scrubber, i.e., a purifying device, and recovered into water stored in the device. Thus, the powder is prevented from being oxidized and the burning is prevented from occurring. The $N_2$ gas from which the powder is separated in the recovering device 40 is exhausted to the outside through the exhausting port 48.

Alternatively, an opening may be disposed in a bottom portion of the dust collecting portion 40, and a powder pan 46 for receiving powder may be disposed under the opening. In this case, the powder of a relatively large size (blocks of powder) is recovered by the powder pan 46. It is considered unlikely that the possibility that the powder of larger size scatters into the surroundings when compared with the powder of smaller size, and therefore, the fear of burning is lower. Thus, there is no problem if the powder of larger size is recovered by the powder pan 46.

In FIG. 1, the compact 3 from which the magnetic powder has been removed is carried further on the belt 32, and transported to the imaging section 50 disposed in the second position. The imaging section 50 includes an LED (a light emitting diode) 52 disposed as a light source under the belt 32 and a camera 54 disposed above the belt 32. In the imaging section 50, in a condition where the LED 52 emits light and the compact 3 is irradiated from underneath, the camera 54 shoots the compact 3.

Figure 8:
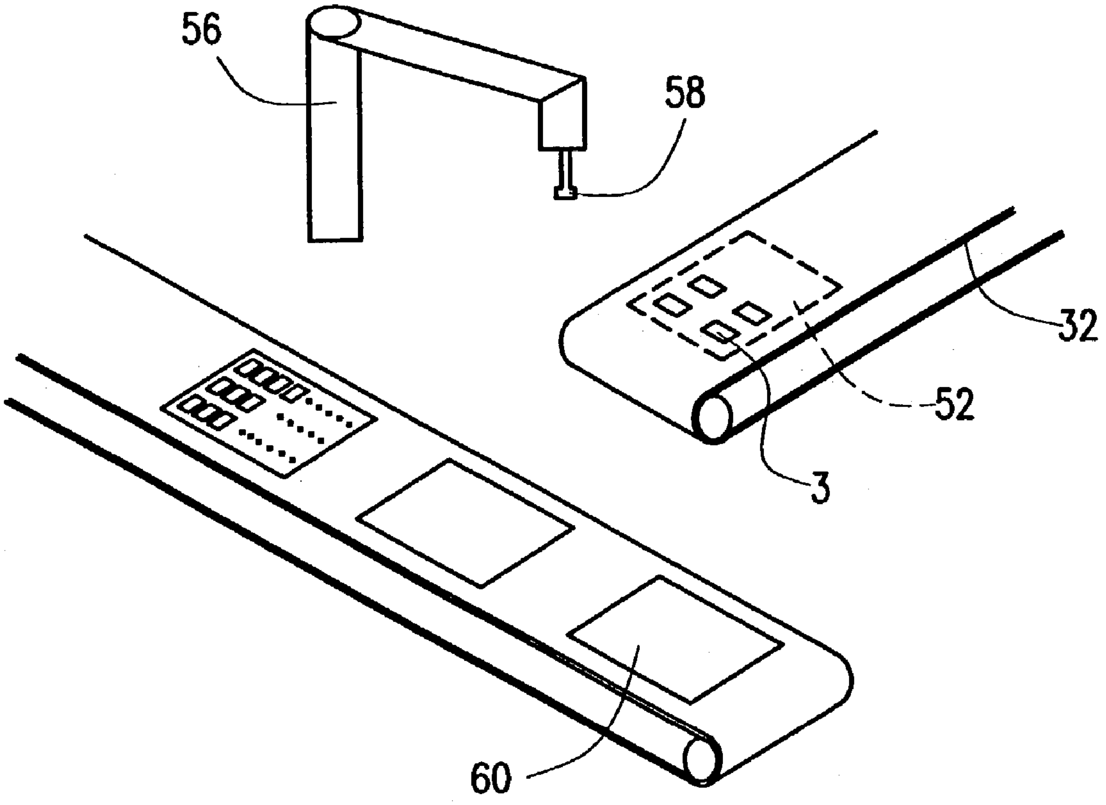
FIG. 8 is a perspective view showing a device for arranging compacts on a sintering plate.

The imaging of the compact 3 is performed so that the shape and the position of the compact 3 on the belt 32 are precisely recognized. As shown in FIG. 8, the compact 3, from which the magnetic powder is removed, is located on a sintering base plate 60, which is the final position in the powder compacting apparatus, by a device 56 for subsequent transport to the sintering process. In order to efficiently perform the sintering process, it is necessary to arrange as many compacts 3 as possible on the sintering base plate 60 with few gaps. For this purpose, a compact gripping portion 58 of the device 56 is configured as a small-sized device provided with a suction nozzle for attaching the surface of a compact 3. In order to reliably grip and carry the compact 3 using such a small-sized compact gripping portion 58, the position and the center of gravity (shape) of the compact 3 on the belt 32 should be detected.

When the compact 3 is to be shot by the camera, the reliable removal of the powder by the powder removing device 30 is effective in terms of improving the precision of shape-recognition of the compact 3. That is, when the powder removing process of this invention is employed, the powder travelling together with the compact will not drop onto the LED 52. Thus, the precision in shape-recognition for imaging will not be degraded. Further, since the belt 32 is configured by a mesh-like material, the LED 52 can supply light, including little shadow, as the light for imaging, and the precision in shape-recognition of the compact 3 by the camera 54 is enhanced.

By appropriately processing an image of the compact 3 shot by the camera 54, the information indicating the position and shape of the compact 3 is generated. Based on the information, the operation of the device 56 is controlled. Accordingly, the device 56 can appropriately arrange the compacts 3 on the sintering base plate 60. The sintering base plate 60 is formed by a molybdenum plate having a thickness of for example 0.5 to 3 mm. After the compacts 3 mounted on the sintering base plate 60, the compacts 3 are subjected to the known processes, such as a sintering process, an aging and annealing process, a surface grinding and surface treatment process, and other processes, such that the final product of a rare earth magnet can be obtained.

Method of Producing Alloy Powder

Cast pieces of R-T-(M)-B type rare earth magnet alloy are produced by a known strip casting process. More specifically, first, an alloy having a composition of Nd: 30 wt %, B: 1.0 wt %, Dy: 1.2 wt %, Al: 0.2 wt %, Co: 0.9 wt %, Cu: 0.2 wt %, and Fe and inevitable impurities as the remainder is melted by high-frequency melting, so as to obtain alloy molten mass. The alloy molten mass, which is kept at 1350° C. is then quenched by a single roll method, so as to obtain alloy cast flakes having a thickness of about 0.3 mm. This quenching is performed under the conditions of the roll peripheral velocity of about 1 m/sec, the cooling rate of 500° C./sec, and the degree of undercooling of 200° C., for example.

The thus-formed quenched alloy has a thickness in the range of not lower than 0.03 mm nor higher than 10 mm. The alloy contains $R_2T_{14}B$ crystal grains having a short-axis size of not lower than 0.1 μm nor higher than 100 μm and a long-axis size of not lower than 5 μm nor higher than 500 μm, and an R-rich phase which exists dispersedly at grain boundaries of the $R_2T_{14}B$ crystal grains. The thickness of the R-rich phase is equal to or lower than 10 μm. A method for producing material alloy by strip casting is disclosed in U.S. Pat. No. 5,383,978, for example.

The particle size of alloy powder produced by a rapid cooling method such as strip casting (quenching speed $10^2$ to $10^4$° C./sec) is easily made uniform, so that the particle size distribution profile is sharp. When a compact is produced by using such alloy powder, the flowability of the powder is low. The powder filling density into the cavity of the die and the density of the obtained compact are easily lowered, such that the compact formed is relatively weak. In the situation where the average particle size are the same, the strength of the compact formed from the alloy powder obtained by the rapid cooling method is low when compared with that of a compact of alloy powder obtained by ingot casting.

Next, a plurality of material packs are filled with material alloy which is coarsely pulverized, and the packs are mounted on a rack. Thereafter, using the above-mentioned material carrying device, the rack on which the material packs are mounted is carried to the front of the hydrogen furnace. Then, the rack is inserted into the inside of the hydrogen furnace. The hydrogen pulverizing process is then initiated in the hydrogen furnace. The material alloy is heated in the hydrogen furnace, and is subjected to the hydrogen pulverizing process. After the pulverization, the material is preferably taken out of the furnace after reaching ambient temperature. Even if the material is taken out in a high temperature condition (40 to 80° C., for example), serious oxidation does not occur if the material is set so as not to be in contact with the air. When using the hydrogen pulverization, the rare earth alloy is coarsely pulverized to have a size of about 0.1 to 1.0 mm. It is preferred that the alloy be coarsely pulverized into flakes having an average size of 1 to 10 mm before the hydrogen pulverizing process.

After the hydrogen pulverization, it is preferred that the material alloy be further minutely deagglomerated, and cooled by a cooling device such as a rotary cooler or the like. In the case where the material is removed while at a relatively high temperature, the period of time for the cooling process by a rotary cooler or the like will be appropriately extended.

When the material powder cooled to about room temperature by a rotary cooler or the like, an additional milling process is performed by a milling device such as a jet mill, so as to produce fine powder of material. In this embodiment, the material powder was finely pulverized in an $N_2$ gas atmosphere by using a jet mill, so as to obtain alloy powder of an average particle size (Mass Median Diameter, MMD) of about 3.5 μm. It is preferred that the amount of oxygen in the $N_2$ gas atmosphere be suppressed to be low levels, e.g., about 10,000 volume ppm. Such a jet mill is described in Japanese Patent Publication No. 6-6728. Preferably, the concentration of oxidizing gas (oxygen and water vapor) contained in the atmosphere gas in the fine pulverization process is controlled, thereby adjusting a content of oxygen (weight) of the alloy powder after the fine pulverization to be equal to or lower than 6000 ppm. When the amount of oxygen in the rare earth alloy powder increases and exceeds 6000 ppm, the ratio of nonmagnetic oxide in a magnet increases, and the magnetic properties of the finally obtained sintered magnet are deteriorated.

In this embodiment, a cyclone classifier disposed in the jet mill is used so as to remove powder having extremely small particle size (ultrafine powder having particle diameters of 1.0 $\mu$m or less). Thus, a ratio of the number of the ultrafine powder is adjusted to be 10% or less (described in U.S. Pat. No. 6,491,765, the content of which is hereby incorporated by reference in this specification). The ultrafine powder is mainly R-rich particles. Such powder tends to react with oxygen. Thus by removing the R-rich ultrafine powder, the amount of the oxygen contained in the entire powder can eventually be reduced. If the quantity of ultrafine powder particles exceeds 10% of the particle quantity of the entire powder, the magnet properties of sintered magnets produced by sintering a compact made of such alloy powder are deteriorated (for example, coercive force of the sintered magnet is less than 900 kA/m). Conversely, if the quantity of ultrafine powder particles is adjusted to 10% or less, the magnet properties of sintered magnets can be improved (for example, coercive force of the sinterd magnet is 900 kA/m or more), due to the relatively small amount of the oxygen (e.g., 6000 ppm or less).

The range of particle size distribution of alloy powder which is thus produced is very narrow. Therefore, the compaction density of a compact which is to be produced in a compressing and compacting process described below has a tendency to be low. Accordingly, the strength of the compact is decreased, so that it is necessary to remove the magnetic powder adhering to the compact without applying any strong force to the compact.

Next, 0.3 wt % of a lubricant, for example, is added to and mixed with the above alloy powder in a rocking mixer, so as to coat the surfaces of the alloy powder particles with the lubricant. As the lubricant, preferably used is a fatty ester diluted with a petroleum-based solvent. In this embodiment, methyl caproate is used as the fatty ester and isoparaffin is used as the petroleum-based solvent. The weight ratio of methyl caproate to isoparaffin was set as 1:9, for example. This type of liquid lubricant advantageously coats the surfaces of the powder particles, and protects the particles from being oxidized. In addition, this type of liquid lubricant advantageously makes the density of a compact in press uniform and improves the powder orientation in the magnetic field.

Examples of the fatty ester usable other than methyl caproate include methyl caprylate, methyl laurylate, and methyl laurate. Examples of the solvent usable other than isoparaffin include other petroleum-based solvents and naphthenic solvents. The lubricant is not limited however to those described above. Further, the lubricant may be added at any timing before, during, or after the fine pulverization. In place of the liquid lubricant, or in addition to the liquid lubricant, a solid (dry-type) lubricant such as zinc stearate may also be used.

Method for Manufacturing Rare Earth Magnet

A compact is produced by using the powder compacting apparatus 1 from the powder of rare earth alloy that is finely pulverized as described above. As described above, unwanted magnetic powder is removed from the surface thereof. A plurality of compacts which are thus produced are arranged on the sintering base plate. A plurality of sintering base plates on which compacts are placed are accommodated in a sintering case, and transported to a sintering apparatus.

In the sintering apparatus, a sintering process is performed after a process for burning off the binder (i.e., debinding process) in order to volatilize the lubricant included in the compact. In the sintering process, compacts are subjected to the sintering process at temperatures of 1000 to 1100 degrees C. for 2 to 5 hours in an argon atmosphere. In this process, the magnetic powder has been previously removed from the surface of the compact such that the magnetic powder will not be fused to the surface of the magnet during sintering. Thus, it is possible to prevent unevenness from occurring on a surface of a sintered body.

Afterwards, the sintered body is cooled to about a room temperature, and then subjected to an aging process in which heating is performed at temperatures of 400 to 600 degrees C. in an argon atmosphere. Through an aging process, the coercive force of the magnet can be improved.

The sintered body of a rare earth magnet to which predetermined magnetic properties are applied is cut and ground so as to have a desired final shape. At this time, the sintered body is relatively smooth and does not have any unwanted fused on its surface, so that it is possible to shorten a time required for working the magnet to the final shape. Thereafter, the magnet is subjected to a surface treatment such as a coating treatment for improving weather resistance. Thus, a rare earth magnet as a final product is completed.

EXAMPLE 1

By using the powder removing device 30 of the powder compacting apparatus 1, an experiment was performed to determine the effect of the removal of magnetic powder when the intensity of a magnetic field applied to the compact 3 was varied. The intensity of the magnetic field in the vicinity of the compact 3 was varied by changing a magnitude of a current flowing to the demagnetizing coil 36. The conditions related to the experiment were shown below.

Compact: the size of a compact was 5 mm thick, 20 mm high, and 30 mm wide, and a compaction density was 4.3 g/cm$^3$.

Magnetic powder: fine powder of rare earth alloy having the magnetization of 0.05 to 0.10 T (magnetic powder adhering to the pole piece accompanied with the magnetic field generating coil of the press) was attracted onto an upper surface of the compact by 1 mm in thickness.

Applied magnetic field: Demagnetization was performed on the compact by applying a decremental alternating pulse magnetic field. The intensity of the magnetic field shown in Table 1 below represents a peak value (the maximum value) of an alternating magnetic field.

Gas spray: $N_2$ gas of 0.2 MPa was intermittently sprayed for a total time of 2 seconds after the application of the magnetic field, so as to remove the demagnetized magnetic powder from the compact.

Under the conditions, the strength (the maximum value) of the applied magnetic field was varied, and the states of the compact after the demagnetization and the gas spray were visually checked. The results are shown in Table 1.

TABLE 1

| Example | magnetic field [T] | remaining power | chipping of compact |
|---|---|---|---|
| 1 | 0.001 | X | none |
| 2 | 0.005 | X | none |
| 3 | 0.010 | X | none |
| 4 | 0.020 | Δ | none |
| 5 | 0.050 | ○ | none |
| 6 | 0.080 | ○ | none |
| 7 | 0.100 | ○ | none |
| 8 | 0.200 | ○ | none |
| 9 | 0.300 | ○ | none |
| 10 | 0.400 | ○ | none |
| 11 | 0.500 | ○ | none |
| 12 | 0.600 | ○ | observed |
| 13 | 0.800 | ○ | relatively large chipping observed |

The meanings of symbols in Table 1 are shown below.

○: The surface of a compact clearly appeared, and powder was little found.

Δ: Powder of about 0.5 mm in thickness adhered to the surface of the compact, and magnetized powder was not remarkably found.

X: Magnetized powder remained on the compact.

As apparent from Table 1, if the strength of the magnetic field is set to 0.02 to 0.5 T, the powder adhering to the surface of the compact can be sufficiently removed, and the crack and chipping of the compact can be prevented. The strength of the magnetic field is measured at the position of the upper surface of the compact by using the gauss meter.

According to the present invention, a demagnetization process is performed for magnetic powder adhering to a compact of rare earth magnet, so that the magnetically attracting force between the compact and the magnetic powder is lowered, and the magnetic powder can be easily removed from the compact. The demagnetized magnetic powder can be easily removed from the surface of the compact by a blow of gas, or other means.

If the magnetic powder is previously removed from the surface of the compact prior to sintering, the magnetic powder will not be fused to the surface of the compact during the subsequent sintering process. Thus, the occurrence of unevenness on the surface of the sintered body can be prevented. The surface of the sintered body thus obtained is relatively smooth, so that it is possible to shorten a time required for grinding the sintered body.

This is especially the case where the shape of the sintered body is similar to the shape of the final magnet product, which according to the present invention shortens the grinding process, and provides the advantage of greatly improving mass production.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A powder compacting apparatus comprising:

means for producing a compact by compacting rare earth alloy powder in an orienting magnetic field;

first means for performing a demagnetizing process for the compact by applying a first magnetic field to the compact; and second means for performing a demagnetizing process for magnetic powder adhering to a surface of the compact by applying a second magnetic field to the compact along a route for moving the compact from a first position in which compaction of the rare earth alloy powder is performed to a second position.

2. The powder compacting apparatus as set forth in claim 1, wherein the means for producing the compact includes a magnetic field generator means for generating the orienting magnetic field in a first direction, and a pressing device for compressing the rare earth alloy powder in the first direction.

3. The powder compacting apparatus as set forth in claim 1, wherein the means for performing the demagnetizing process for the magnetic powder comprises a means for applying an alternating magnetic field to the compact.

4. The powder compacting apparatus of claim 3, further comprising a moving means for moving the compact, wherein the means for performing the demagnetizing process applies a decremental alternating magnetic field to the compact while the compact is moving.

5. The powder compacting apparatus as set forth in claim 4, wherein the means for performing the demagnetizing process for the magnetic powder comprises a plurality of coils disposed along a route for moving the compact.

6. The powder compacting apparatus as set forth in claim 1, further comprising means for spraying a gas on the surface of the compact disposed along a route for moving the compact from a position in which the compaction of the rare earth alloy powder is performed to the second position.

7. The powder compacting apparatus as set forth in claim 1, further comprising a gas suction device having a suction port, wherein magnetic powder removed from the surface of the compact is suctioned into the suction device.

8. The powder compacting apparatus as set forth in claim 1, further comprising:

a nonmagnetic mesh member for moving the compact from a first position to a second position;

means for placing the compact onto the nonmagnetic mesh member;

means for driving the nonmagnetic mesh member; and means for moving the compact on the nonmagnetic mesh member onto a sintering base plate in the second position.

9. The powder compacting apparatus as set forth in claim 8, wherein at least part of the means for performing the demagnetizing process for the magnetic powder is an electromagnet disposed under the nonmagnetic mesh member.

* * * * *